United States Patent [19]

Gray

[11] Patent Number: 4,894,761
[45] Date of Patent: Jan. 16, 1990

[54] PROTECTIVE SHIELD FOR A VEHICLE LAMP ASSEMBLY

[75] Inventor: Derick Gray, Warwickshire, England

[73] Assignee: Signam Limited, Warwick, United Kingdom

[21] Appl. No.: 105,238

[22] Filed: Oct. 7, 1987

[30] Foreign Application Priority Data

Aug. 10, 1987 [GB] United Kingdom ............... 8718876

[51] Int. Cl.⁴ ............................................. F21V 15/00
[52] U.S. Cl. ...................................... 362/376; 362/61; 362/268
[58] Field of Search ................... 362/61, 80, 268, 376, 362/311, 457, 255, 256, 375, 377

[56] References Cited

U.S. PATENT DOCUMENTS

| | | | |
|---|---|---|---|
| 1,890,130 | 12/1932 | Scardina | 362/376 |
| 1,910,779 | 5/1933 | Stockman | 362/376 |
| 2,544,378 | 3/1951 | Cyr | 362/317 |
| 2,786,936 | 3/1957 | Appleton | 362/376 X |
| 3,086,104 | 4/1963 | Atkin | 362/375 X |
| 4,160,286 | 7/1979 | Merritt | 362/376 X |
| 4,432,045 | 2/1984 | Merritt | 362/376 X |
| 4,460,945 | 7/1984 | Chan et al. | 362/376 X |
| 4,489,367 | 12/1984 | Herron et al. | 362/376 X |

FOREIGN PATENT DOCUMENTS

| | | | |
|---|---|---|---|
| 1063076 | 9/1979 | Canada | 362/376 |
| 728055 | 4/1955 | United Kingdom | 362/376 |

*Primary Examiner*—Ira S. Lazarus
*Assistant Examiner*—Peggy A. Neils
*Attorney, Agent, or Firm*—Fleit, Jacobson, Cohn, Price, Holman & Stern

[57] ABSTRACT

A light-transmitting plastics shield 1 is provided with distance pieces 5 for attachment to the lens 2 of a headlamp, each distance piece comprising a male part 6 and a female part 7, the male part being ultrasonically welded to the shield and comprising a cylindrical head 12 supported between spaced walls 10, 11, the female part 7 comprising a disc-shaped base 14 carrying a socket portion 16, and the base being secured to the lens by an adhesive foam pad 15. The heads 12 are received within the socket portions 16 and are mounted with their axes parallel to allow the shield to be pivoted away from the lens for cleaning. The heads are also capable of axial movement within the sockets to allow for thermal expansion of the shield.

14 Claims, 3 Drawing Sheets

PROTECTIVE SHIELD FOR A VEHICLE LAMP ASSEMBLY

BACKGROUND OF THE INVENTION

1. Field of the Invention

This invention relates to a protective shield for a vehicle headlamp, and more particularly to a plastic shield attachable to a headlamp assembly for protecting the front lens thereof.

2. Description of the Prior Art

The front lens of a vehicle headlamp assembly is very vulnerable to impact damage from stones or other hard objects thrown up from the road. These lenses can be rather costly to replace and, unlike windscreens for example, are not covered by normal motor vehicle insurance.

An existing solution makes use of a transparent plastics shield that is shaped to clip over the headlamp assembly. However, this system is limited in its application since many vehicle headlamps do not easily lend themselves to this kind of attachment, and rigid screw fixing must be used.

BRIEF SUMMARY OF THE INVENTION

The present invention is addressed to providing a solution which is potentially universal in its application to existing headlamp or similar vehicle lamp assemblies and which, moreover, may be produced at lower cost than the existing system.

The present invention provides a light transmitting shield for protecting a light-emitting face of a vehicle lamp assembly, the shield being provided with distance pieces for spacing the shield from the said face in use, and an adhesive being provided for attachment of the distance pieces directly to the face.

Since the shield portion can be smaller than in the earlier device, the cost is reduced accordingly.

The adhesive may be provided in a separate tube which is sold together with the shield. However, the adhesive is preferably provided as a layer of pressure sensitive adhesive applied to each of the distance pieces. The distance pieces may each include a resilient pad for reducing transmission of an impact to the protected face of the lamp assembly. The pad may conveniently be a foam pad having a pressure sensitive adhesive layer applied to its surface. With such an arrangement the pad conforms to any small surface irregularities in the protected face. However, in order to remove any risk of the adhesive parting from the foam, the pad is preferably formed of a layer of foamed pressure sensitive adhesive. The layer is preferably from 0.3 mm to 1.5 mm thick, ideally from 0.5 to 1.0 mm. Smaller thicknesses tend to give reduced adhesion, particularly on uneven surfaces, and greater thicknesses are unnecessarily costly.

The distance pieces may each include a pivotal connection to ensure that they seat firmly upon the protected face of the lamp assembly. Furthermore, they preferably each provide for relative lateral movement between the shield and the protected face to allow for differential thermal expansion.

The distance pieces preferably each comprise a releasable two-part connector to permit the shield to be removed for cleaning. Each distance piece may comprise male and female parts, the male part comprising a bar-like head portion which is received, preferably as a snap fit, within the female portion for pivotal movement about the axis of the head portion.

Preferably at least two of the distance pieces have the axes of their respective head portions aligned so that the shield can be pivoted away from the protected face about the aligned axes when the remainder of the distance pieces have been disconnected.

The invention includes a vehicle lamp assembly having a protective light transmitting shield as described above secured directly to a light emitting face thereof, and a vehicle including the lamp assembly.

The invention will now be exemplified in the following description to be read in conjunction with the accompanying drawings wherein.

Figure 1:
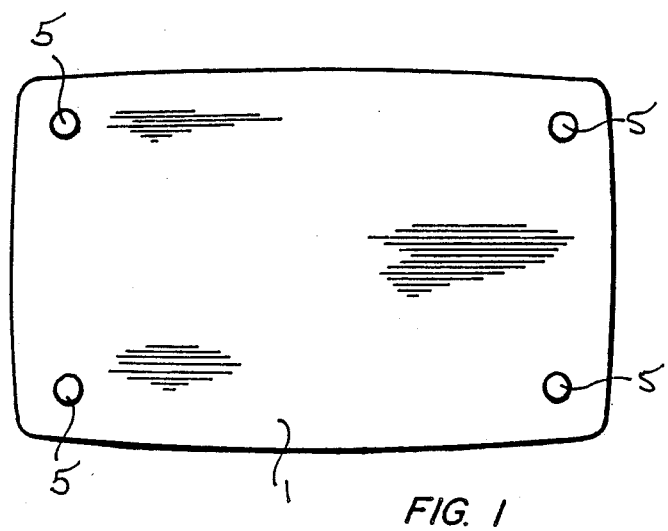
FIG. 1 is a front view of a typical shield in accordance with the invention.
Figure 2:
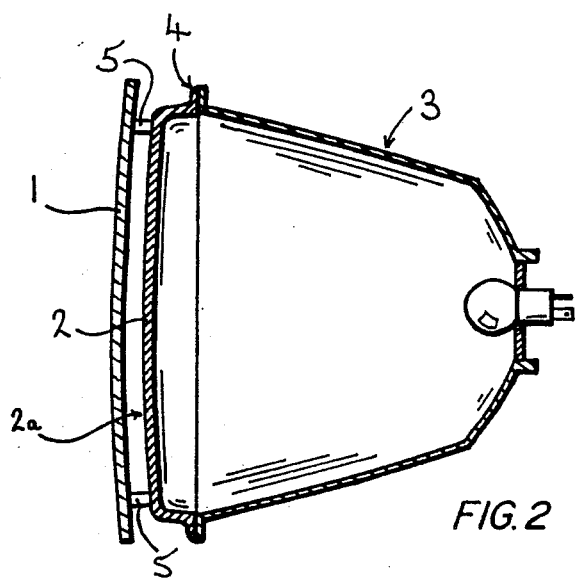
FIG. 2 is a cross sectional view of the shield fitted to a vehicle headlamp.

Referring to FIGS. 1 and 2, the shield 1 is formed of a sheet of clear acrylic, typically 0.3 mm thick. The outline of the shield approximates to a rectangle and closely conforms to the outline of the front light-emitting lens 2 of the particular headlamp 3 which it is designed to fit. The shield thus covers substantially the entire front surface 2a of the lens together with any edging lip 4. In some applications it may be desirable for aesthetic or practical reasons to leave the edging lip exposed, but the risk of impact damage in this region is small. If the edging lip or a peripheral portion of the lens is already protected by the body of the vehicle it would not be necessary for the shield to extend over that portion in any case. The shield is curved outwardly to conform to the convex curvature of the external front face of the lens, the required shape being produced by vacuum thermoforming for example.

Figure 3:
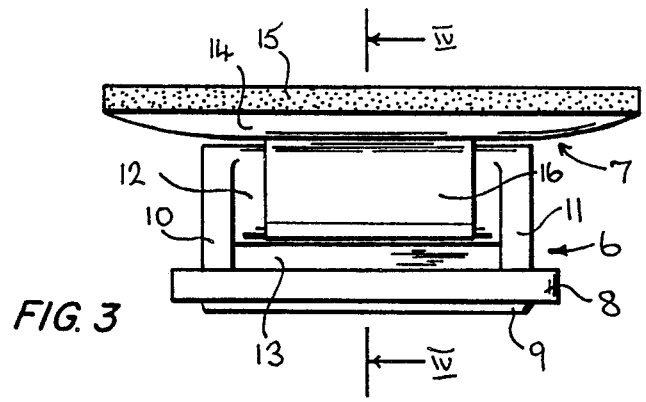
FIG. 3 is a detailed plan view of a distance piece used to mount the shield on the headlamp.
Figure 4:
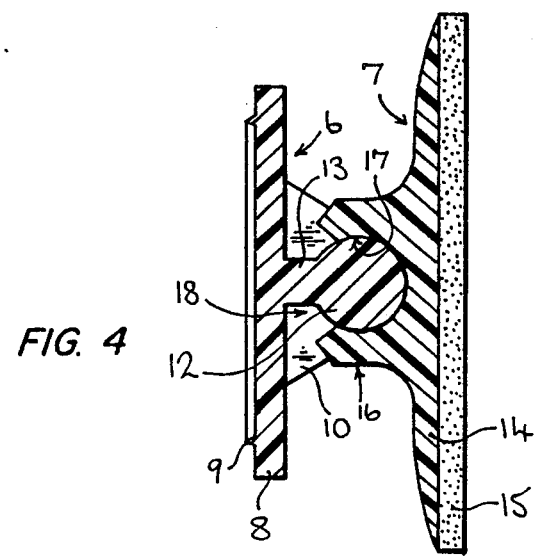
FIG. 4 is a cross-sectional view taken along line IV-IV of FIG. 3.

The shield is secured directly to the lens by four distance pieces 5, one mounted in each corner of the shield. The distance pieces are of substantially identical design, and one of them will now be described in detail with reference to FIGS. 3 and 4.

Each distance piece 5 comprises a male part 6 and a female part 7. The male part is injection molded from u.v. stabilized clear S.A.N. or similar high strength material, and has a flat disc-shaped base 8. The rear surface of the base 8 has an annular energy director rib 9 of V cross section for use in ultrasonic welding. Two spaced walls 10, 11 are upstanding from the front face of the base 8, and a cylindrical bar-like head 12 extends between these walls. The head 12 is spaced from the base but is joined to it along the length of the head by a web 13.

The female part 7 is injection molded from grey semi-light-transmitting u.v. stabilized kemetal acetal copolymer or similar flexible material. This part again comprises a disc-shaped base 14 having a flat rear face to which is applied a 1.0 mm thick circular resilient pad 15 formed of a foamed pressure sensitive acrylic adhesive. The front face of base 14 carries a socket portion 16. This socket portion has a part-cylindrical recess 17, open at both ends, to receive the head 12 as a snap fit via a mouth 18 facing away from base 14. The mouth 18 is wider than the web 13 to permit about plus or minus 45 degrees of relative angular movement between the male and female parts about the axis of head 12. The socket portion 16 is also somewhat shorter than the head 12 (see FIG. 3) to permit relative axial movement between the two parts 6, 7.

The rear face of the male part 6 is rigidly attached to the rear of the shield 1 by ultrasonic welding causing the rib 9 to melt and form the weld. The orientation of the male parts is such that their heads 12 are disposed on parallel axes aligned with the longer, horizontal direction of the shield. The shield is supplied to the user with the rear face of pads 15 covered with protective backing which the user peels off prior to use. The lens 2 is first cleaned of any adhering dirt or grease and, with the male and female parts joined, the shield is correctly positioned over the lens. The pads are then pressed firmly onto the lens to secure the shield in place. The resilient pad 15 conforms to any small surface irregularities in the lens or a non-parallel meeting between the surfaces, ensuring a secure attachment.

Since the material of the shield is slightly resilient the shield is able to flex between the distance pieces 5 to absorb the impact of a stone or other hard object which may strike it. It has been found that most breakages result from direct point contact between the impacting object and the lens so that even if the object should strike the shield directly over one of the distance pieces 5 the load is spread over an appreciable area of the lens by the pads 15 reducing the risk of breakage. The resilient foam pads also tend to absorb some of the impact. In addition to preventing an impact from being transmitted to the lens, the gap between the shield and the lens also permits an air stream to pass over the lens for cooling purposes.

If it is found necessary to clean the lens the shield can be removed by pulling the shield so that the heads 12 pop out of the socket portions 16. In cases where the headlamp lens is recessed into the bodywork of the vehicle a small finger notch may be provided in one edge of the shield. The provision for angular movement between the male and female parts makes it possible in some circumstances to wipe behind the shield with only the top or bottom pair released, the shield 1 being angularly hinged away from the lens. The lateral movement between the male and female parts noted above allows for differential thermal expansion between the shield and lens, the expansion being greater in the longer, horizontal direction.

The shield may be extended to cover adjacent side lights. A similar shield may be used to protect a fog lamp or other lamp assembly. On circular lamps only three distance pieces may be required and on larger shields more than four may be used.

The shield may have decorative material applied to it, e.g. by silk screen printing, particularly around its edges where light transmission is unlikely to be seriously impaired.

Figure 5:
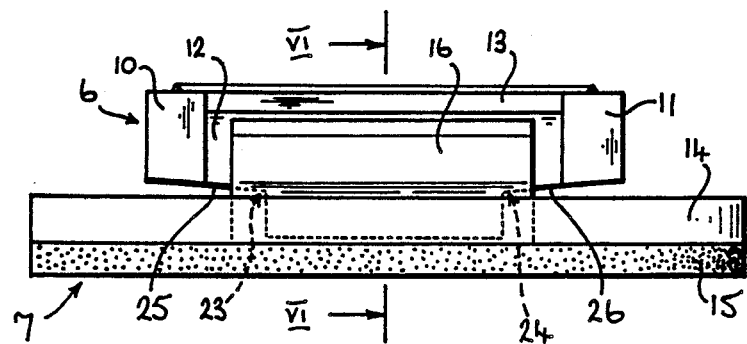
FIG. 5 is a plan view of another embodiment of the distance piece in accordance with the invention.
Figure 6:
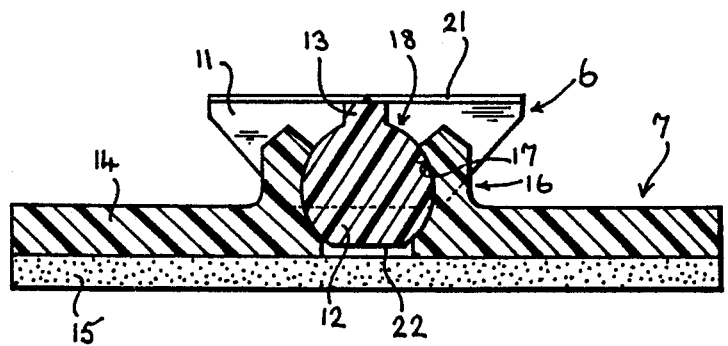
FIG. 6 is a cross-sectional view taken along line VI—VI of FIG. 5.

The distance piece of FIGS. 5 and 6 can be used in situations where a smaller gap between the shield and the lens is required, e.g. on headlamps provided with wipers. The distance piece again comprises male and female parts 6, 7 of similar design to those described above, but the base 8 is omitted from the male part. An H-shaped, V cross-section energy director rib 21 is now provided directly on the H-shaped rear face formed by the web 13 and end walls 10, 11. The front face of the cylindrical head 12 in this embodiment has a flat surface 22 and is provided with steps 23, 24 (FIG. 5) at each end. These steps have sloping shoulders 25, 26 which are continuous with the front faces of end walls 10 and 11. The female part 7 again comprises a disc-shaped base 14, an adhesive foam pad 15 and socket portion 16, except that the socket portion does not project as far from the base. The recess 17 may be open at the rear face of base 14 or closed by a thin web. Since the steps 23, 24 do not extend to the widest mid portion of the head they do not reduce its retention in the socket portion 16, but they permit axial movement of the head within the socket portion. The two parts again provide for relative pivotal movement and operate in precisely the same way as that described above.

I claim:
1. A device for protecting the light-emitting face of a vehicle lamp assembly, said face having a peripheral edge, comprising:
   a light transmitting shield in the form of a sheet of plastics material for covering at least a portion of said face and protecting said face from impact damage;
   a plurality of mutually spaced distance pieces secured to said shield for spacing said shield from said face in use, each distance piece comprising a releasable two part connector; and
   an adhesive for attachment of said distance pieces to said face, said distance pieces being arranged for attachment directly to said light-emitting face at positions inset from the peripheral edge thereof.
2. A device as claimed in claim 1, wherein:
   said adhesive comprises a layer of pressure sensitive adhesive applied to each of said distance pieces.
3. A device as claimed in claim 1, wherein:
   said distance pieces each include a resilient pad.
4. A device as claimed in claim 3, wherein:
   each pad is from 0.3 to 1.5 mm thick.
5. A device as claimed in claim 4, wherein:
   each pad is from 0.5 to 1.0 mm thick.
6. A device as claimed in claim 1, wherein:
   each distance piece comprises means for facilitating relative lateral movement between said shield and said face of the lamp assembly.
7. A device as claimed in claim 1, wherein:
   each distance piece comprises male and female connector parts which are mutually engageable by a snap fit.
8. A device as claimed in claim 7, wherein:
   said male connector part comprises a bar-like head portion having a longitudinal axis; and
   said bar-like portion is received within said female part for pivotal movement about said axis of said head portion.
9. A device as claimed in claim 8, wherein:
   longitudinal axes of head portions of at least two of said distance pieces are substantially aligned so that said shield is pivotable away from said face about said aligned axes when each connector of the remainder of said distance pieces has been disconnected.
10. A device as claimed in claim 9, wherein:
    said head portion is axially movable within said female part of each distance piece.
11. A device as claimed in claim 1, wherein:
    an energy director rib is provided on each distance piece; and each distance piece is attached to said shield by an ultrasonic weld at said rib.

12. A vehicle lamp assembly having a protective device as claimed in claim 1.

13. A device for protecting the light-emitting face of a vehicle lamp assembly, said face having a peripheral edge, comprising:
- a light transmitting shield in the form of a sheet of plastics material for covering at least a portion of said face and protecting said face from impact damage;
- a plurality of mutually spaced distance pieces secured to said shield for spacing said shield from said face in use, each distance piece comprising a resilient pad in the form of a layer of foamed pressure sensitive adhesive for attachment of each distance piece to said face, said distance pieces being arranged for attachment directly to said light-emitting face at positions inset from the peripheral edge thereof.

14. A device for protecting the light-emitting face of a vehicle lamp assembly, said face having a peripheral edge, comprising:
- a light transmitting shield in the form of a sheet of plastics material for covering at least a portion of said face and protecting said face from impact damage;
- a plurality of mutually spaced distance pieces secured to said shield for spacing said shield from said face in use, each distance piece including a pivotal connection; and
- an adhesive for attachment of said distance pieces to said face, said distance pieces being arranged for attachment directly to said light-emitting face at positions inset from the peripheral edge thereof.

* * * * *